(12) United States Patent
Nezu

(10) Patent No.: US 12,141,719 B2
(45) Date of Patent: Nov. 12, 2024

(54) DISPLAY MANAGEMENT DEVICE, DISPLAY MANAGEMENT METHOD, AND PROGRAM

(71) Applicant: Sharp NEC Display Solutions, Ltd., Tokyo (JP)

(72) Inventor: Eifu Nezu, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 25 days.

(21) Appl. No.: 17/613,263

(22) PCT Filed: Feb. 7, 2020

(86) PCT No.: PCT/JP2020/004778
§ 371 (c)(1),
(2) Date: Nov. 22, 2021

(87) PCT Pub. No.: WO2020/240938
PCT Pub. Date: Dec. 3, 2020

(65) Prior Publication Data
US 2022/0222589 A1    Jul. 14, 2022

(30) Foreign Application Priority Data
May 27, 2019    (WO) .................. PCT/JP2019/020913

(51) Int. Cl.
*G06Q 10/02*    (2012.01)
*G06Q 30/0272*    (2023.01)

(52) U.S. Cl.
CPC ......... *G06Q 10/02* (2013.01); *G06Q 30/0272* (2013.01)

(58) Field of Classification Search
CPC ............... G06Q 10/02; G06Q 30/0272; G06Q 30/0241; G06Q 30/02
See application file for complete search history.

(56) References Cited

U.S. PATENT DOCUMENTS

| | | | |
|---|---|---|---|
| 11,244,350 B1* | 2/2022 | Soliman | G06Q 30/0246 |
| 2011/0282727 A1* | 11/2011 | Phan | G06Q 30/0241 |
| | | | 705/14.1 |

(Continued)

FOREIGN PATENT DOCUMENTS

| | | |
|---|---|---|
| CN | 107871173 A | 4/2018 |
| CN | 108876089 A | 11/2018 |

(Continued)

OTHER PUBLICATIONS

Usability.gov, User Interface Elements, Jul. 8, 2013, https://web.archive.org/web/20130708215553/https://www.usability.gov/how-to-and-tools/methods/user-interface-elements.html, pp. 1-6 (Year: 2013).*

(Continued)

*Primary Examiner* — John Van Bramer
(74) *Attorney, Agent, or Firm* — MCGINN I.P. LAW GROUP, PLLC

(57) ABSTRACT

A display management device includes an acquisitioner and a data processor. The acquisitioner acquires occupancy request information from a first terminal. The occupancy request information indicates that a request is made to display content on a plurality of displays positioned in a first region. When the acquisitioner acquires the occupancy request information, the data processor generates a available time display data using a display information storage and transmits same to the first terminal. The display information storage stores information relating to available time of the plurality of displays positioned in the first region. The available time display data is data for displaying a screen which shows availability information including the number of displays which can be reserved and/or the occupancy rate thereof for each time period.

20 Claims, 10 Drawing Sheets

(56) References Cited

U.S. PATENT DOCUMENTS

2017/0308922 A1   10/2017  Mongeau
2018/0091841 A1 *  3/2018  Kumetani .......... H04N 21/2668
2018/0276716 A1    9/2018  Mino et al.

FOREIGN PATENT DOCUMENTS

| JP | 2011-109564 A | | 6/2011 | | |
|---|---|---|---|---|---|
| JP | 2011198052 A | * | 10/2011 | | |
| JP | 2018-055276 A | | 4/2018 | | |
| JP | 2018-160069 A | | 10/2018 | | |
| WO | WO-2017033066 A1 | * | 3/2017 | ......... | G06Q 10/0631 |

OTHER PUBLICATIONS

Extended European Search Report issued Jan. 3, 2023 for European Patent Application No. 20813312.4-1218.
International Search Report (ISR) (PCT Form PCT/ISA/210), in PCT/JP2020/004778, dated Apr. 21, 2020.
Chinese Office Action in CN No. 20208003864.9 issued on Apr. 24, 2024 with English translation thereof.

* cited by examiner

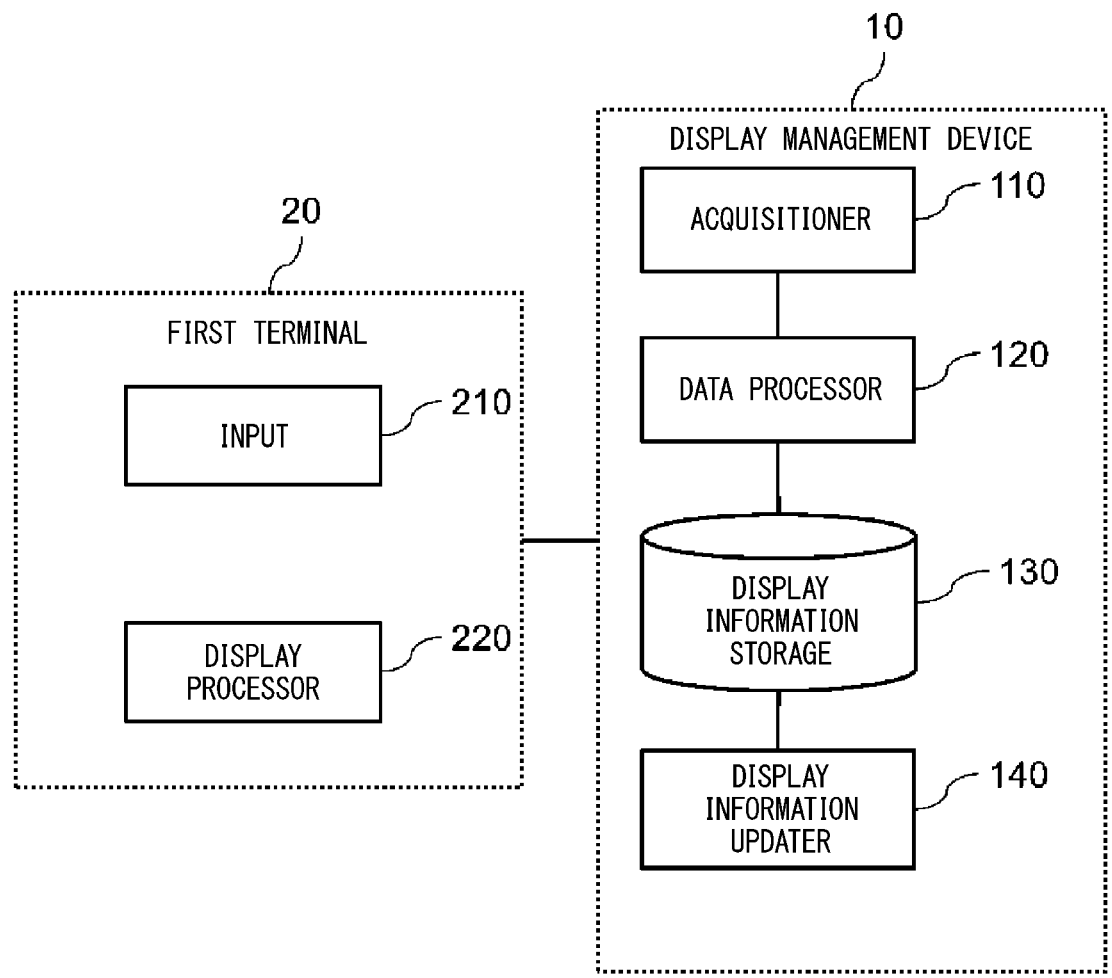

| DATE | |
|---|---|
| TIME PERIOD | RESERVATION |
| 7:00~8:00 | PRESENCE |
| 8:00~9:00 | ABSENCE |
| ⋮ | ⋮ |

130

| DATE | |
|---|---|
| TIME PERIOD | OCCUPANCY RATE |
| 7:00~8:00 | 75% |
| 8:00~9:00 | 30% |
| ⋮ | ⋮ |

RESERVATION INFORMATION(130)

| DISPLAY ID | | |
|---|---|---|
| TIME PERIOD | RESERVATION | REQUESTER INFORMATION |
| 20:00-20:30 | ABSENCE | — |
| 20:30-21:00 | ABSENCE | — |
| 21:00-21:30 | PRESENCE | CAR |
| 21:30-22:00 | ABSENCE | — |
| ⋮ | ⋮ | ⋮ |

DISPLAY MANAGEMENT DEVICE, DISPLAY MANAGEMENT METHOD, AND PROGRAM

TECHNICAL FIELD

The present invention relates to a display management device, a display management method, and a program.

BACKGROUND ART

In recent years, displays have been disposed in various places in public spaces. These displays provide various types of content such as advertisements to passersby and the like.

In general, administrators of a plurality of the displays described above often differ from each other. In this case, a person who desires to display content on the plurality of displays, that is, a content provider, needs to negotiate with each of the administrators.

On the other hand, Patent Literature 1 describes that an advertisement management device selects an advertisement medium according to a request from a requester of advertisement content and distributes the advertisement content to the selected advertisement medium.

CITATION LIST

Patent Literature

[Patent Literature 1]
Japanese Unexamined Patent Application, First Publication No. 2018-160069

SUMMARY OF INVENTION

Technical Problem

A content provider may desire to occupy displays present in a specific region at a certain rate or more in a certain time period in order to enhance effects of providing content.

An example of an object of the present invention is to make it easier to occupy displays present in a specific region at a certain rate or more.

Solution to Problem

According to the present invention, it is provided a display management device including:

an acquisitioner configured to acquire occupancy request information for requesting content to be displayed on a plurality of displays positioned in a first region from a first terminal; and a data processor configured to, when the occupancy request information is acquired, generate available time display data for displaying a screen showing availability information for each time period, the availability information including at least one of the number of displays reservable for simultaneous display and a rate thereof among the plurality of displays using a display information storage configured to store information on available times of the plurality of displays, and transmit the available time display data to the first terminal.

According to the present invention, it is provided a display management device including:

an acquisitioner configured to acquire, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and a data processor configured to select a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generate available time display data for displaying the selected regions and time periods, and transmit the available time display data to the first terminal.

According to the present invention, it is provided a display management method including:

acquiring, by a computer, from a first terminal, occupancy request information indicating that content is requested to be displayed on a plurality of displays positioned in a first region; and generating, by the computer, available time display data for displaying a screen showing availability information including at least one of the number of displays reservable for simultaneous display and a rate thereof among the plurality of displays for each time period using a display information storage configured to store information on available times of the plurality of displays when the occupancy request information is acquired, and transmitting the available time display data to the first terminal.

According to the present invention, it is provided a display management method including:

acquiring, by a computer, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and selecting, by the computer, a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generating available time display data for displaying the selected regions and time periods, and transmitting the available time display data to the first terminal.

According to the present invention, it is provided a program causing a computer to have:

a function of acquiring, from a first terminal, occupancy request information indicating that content is requested to be displayed on a plurality of displays positioned in a first region; and a function of generating available time display data for displaying a screen showing availability information including at least one of the number of displays reservable for simultaneous display and a rate thereof among the plurality of displays for each time period using a display information storage configured to store information on available times of the plurality of displays when the occupancy request information is acquired, and transmitting the available time display data to the first terminal.

According to the present invention, it is provided a program causing a computer to have:

a function of acquiring, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and a function of selecting a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generating available time display data for displaying the selected regions and time periods, and transmitting the available time display data to the first terminal.

Advantageous Effects of Invention

According to the present invention, it becomes easy to occupy displays present in a specific region at a certain rate or more.

BRIEF DESCRIPTION OF DRAWINGS

The object described above, other objects, characteristics, and advantages will be further clarified by preferred embodiments to be described hereinafter and the following accompanying drawings.

FIG. 1 is a diagram illustrating a functional configuration of a display management device and a first terminal according to a first embodiment.

FIG. 2 is a diagram illustrating a first example of information stored in a display information storage.

DESCRIPTION OF EMBODIMENTS

Figures 3, 4, 5:
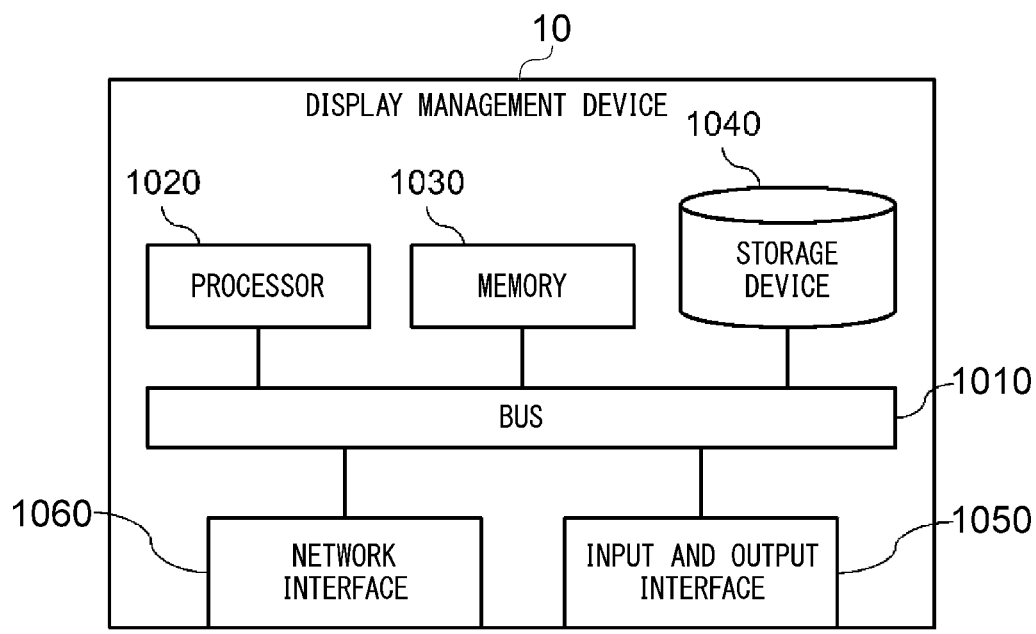
FIG. 3 is a diagram illustrating a first example of reservation information illustrated in FIG. 2.
FIG. 4 is a diagram illustrating a second example of information stored in the display information storage.
FIG. 5 is a block diagram illustrating a hardware configuration of a display management device.

Hereinafter, embodiments of the present invention will be described with reference to the drawings. In all drawings, the same components are denoted by the same reference numerals, and description thereof will be omitted appropriately.

First Embodiment

FIG. 1 is a diagram illustrating a functional configuration of a display management device 10 and a first terminal 20 according to the present embodiment. The display management device 10 is a device that manages available time of a plurality of displays, such as a plurality of digital signs. The plurality of displays are disposed in various places such as in a public space or a store, and display content to be provided to passersby or people who enter the store, such as advertisements. A person who desires to display content on at least some of these plurality of displays (hereinafter referred to as a content provider) searches for available time of the plurality of displays using the display management device 10.

A content provider may desire to occupy a certain rate or more of displays present in a specific region in a certain time period. In such a case, when the content provider searches for the available time of each display, a load on the display management device 10 is increased.

On the other hand, the display management device 10 according to the present embodiment includes an acquisitioner 110 and a data processor 120.

The acquisitioner 110 acquires occupancy request information from the first terminal 20. The first terminal 20 is a terminal that is operated by the content provider. The occupancy request information indicates that the content is requested to be displayed on a plurality of displays positioned in a first region.

When the acquisitioner 110 acquires the occupancy request information, the data processor 120 generates available time display data using the display information storage 130 and transmits the available time display data to the first terminal 20. The display information storage 130 stores information on the available time of the plurality of displays positioned in the first region. The available time display data is data for displaying a screen showing, for each time period, available information including at least one of the number of displays reservable for simultaneous display among the plurality of displays and a rate thereof. As an example, the available time display data is data for displaying a screen showing, for each time period, availability information including at least one of the number of displays not filled with a content display schedule in at least a part of the time period and not scheduled to display content (that is, reservable for simultaneous display) and an occupancy rate thereof. A rate of available displays (hereinafter referred to as an occupancy rate) is, for example, a rate of the number of available displays positioned in the first region to the number of displays positioned in the first region.

A "display not scheduled to display content" may be in the following states, for example.

1) A display not scheduled to display content at all in a predetermined time period (for example, 19:00 to 20:00)

2) A display scheduled to display at least one piece of content in a time period such as a predetermined time period (for example, 19:00 to 20:00), but capable of displaying other content by sharing.

In the example illustrated in FIG. 1, the display information storage 130 is a part of the display management device 10. However, the display information storage 130 may be a storage external to the display management device 10. Further, the display information storage 130 stores information on displays in various regions. An example of information stored in the display information storage 130 will be described below with reference to FIG. 2.

The first terminal 20 is, for example, a terminal that is operated by a content provider, and includes an input 210 and a display processor 220. The first terminal 20 may be a fixed terminal or may be a portable terminal.

The input 210 acquires the occupancy request information described above. For example, the input 210 determines whether or not the occupancy request information has been input by using an input to an input device such as a mouse, keyboard, or touch panel performed by a user of the first terminal 20, such as the content provider.

When the display processor 220 receives the available time display data from the display management device 10, the display processor 220 displays a screen showing availability information including at least one of the number of available displays and an occupancy rate for each time period.

Further, the display management device 10 includes a display information updater 140. The display information updater 140 receives time period selection information for specifying a time period selected by the user of the first terminal 20 from the first terminal 20 after the data processor 120 transmits the available time display data to the first terminal 20. The display information updater 140 updates the display information storage 130 to change the time period indicated by the time period selection information to a state in which there is no available display. That is, the display information updater 140 performs a process for allowing the user of the first terminal 20 to occupy all of the displays that are positioned in the first region and of which the time period indicated by the time period selection information is available. The update of the display information storage 130 described above is an example of this process.

With this update, the content provider can perform the following content display modes in the same time period (for example, 20:00 to 21:00).

(1) Displaying the same content at the same timing on displays at a certain rate among a plurality of displays present in the first region.

(2) Displaying the same content at different timings from display to display on displays at a certain rate among the plurality of displays present in the first region.

(3) Displaying different content from display to display at the same timing on displays at a certain rate among the plurality of displays present in the first region.

In order to execute any of the above display modes, the display management device 10 needs to include a content schedule manager or to be linked with a device that performs content schedule management. Specifically, after the display information storage 130 is updated, the content provider sets which content is to be displayed at which timing via, for example, the display information updater 140 for each of the occupied displays. The display information updater 140 stores a set content display schedule for each display in a schedule storage included in the display management device 10 or a schedule storage device external to the display management device 10. The display information storage 130 may also serve as a schedule manager.

FIG. 2 is a diagram illustrating a first example of the information stored in the display information storage 130 in a table format. The display information storage 130 stores display identification information (a display ID) imparted to each display, information for specifying a region in which the display is positioned (region specifying information), information for specifying an administrator of the display (administrator specifying information), attribute information of the display, and reservation information for specifying an available date and time of the display. The reservation information is an example of the information on the available time described above.

The region specifying information may be an address or may be latitude and longitude information. The administrator specifying information may be identification information (an ID) imparted to the administrator, or may be a name of the administrator.

The attribute information of the display includes, for example, at least one of information indicating whether an installation place is an indoor place or an outdoor place, information indicating the number of passersby on a road facing the screen (also including attribute-based cases) and a size of the screen (at least one of an area and inches), whether or not an audio output is possible (including an audible range when the audio output is possible), a direction of the screen (for example, a direction of a normal of the screen), information for specifying a range of standing positions in which the screen can be viewed, a time period in which it is difficult to view the screen of the display (for example, due to backlight), information on facilities near the display, and information indicating a point which is positioned near the display and at which it is easy for people to gather. The information on facilities is, for example, at least one of presence or absence of a customer attraction facility such as a theme park or a shopping mall (may include information for specifying a name of the customer attraction facility, a distance to the facility, and a holiday), presence or absence of an event and information for specifying a place at which the event is held, and the number of passengers getting on and off in each time period at a nearest station. The point at which it is easy for people to gather may be a meeting spot, and a point at which people are expected to gather in specific weather, such as a point with a roof.

Further, the attribute information of the display may include a weather forecast (weather or a temperature in each time period) of a region in which the display is disposed. In this case, the display information updater 140 updates the attribute information using information on a weather forecast stored in an external server.

Further, the attribute information of the display may include information indicating the popularity of the display. The information indicating the popularity may be, for example, an operating rate of the display in the past, or may be the number of reservations made on the basis of the occupancy request information.

FIG. 3 is a diagram illustrating a first example of the reservation information illustrated in FIG. 2 in a table format. The display information storage 130 stores, as the reservation information, information indicating whether or not a content display reservation is made for the display for each date and time. Therefore, the data processor 120 of the display management device 10 can calculate the above availability information, for example, both the number of available displays and the occupancy rate, by using the reservation information.

FIG. 4 is a diagram illustrating a second example of the information stored in the display information storage 130 in a table format. The display information storage 130 stores, for each region, information indicating the occupancy rate of the available displays for each date and time. This information can be generated using, for example, the information illustrated in FIG. 2. In this case, the information illustrated in FIG. 2 may be stored in a storage external to the display management device 10.

FIG. 5 is a block diagram illustrating a hardware configuration of the display management device 10. The display management device 10 includes a bus 1010, a processor 1020, a memory 1030, a storage device 1040, an input and output interface 1050, and a network interface 1060.

The bus 1010 is a data transmission line that allows the processor 1020, the memory 1030, the storage device 1040, the input and output interface 1050, and the network interface 1060 to transmit and receive data to and from each other. However, a method of connecting the processor 1020 and the like to each other is not limited to a bus connection.

The processor 1020 is a processor that is realized by a central processing unit (CPU), a graphics processing unit (GPU), or the like.

The memory 1030 is a main storage device that is realized by a random access memory (RAM) or the like.

The storage device 1040 is an auxiliary storage device that is realized by a hard disk drive (HDD), a solid state drive (SSD), a memory card, a read only memory (ROM), or the like. The storage device 1040 stores program modules that realize respective functions of the display management device 10. When the processor 1020 reads each of these program modules into the memory 1030 and executes the program modules, each of the functions corresponding to the program modules is realized.

The input and output interface 1050 is an interface for connecting the display management device 10 to various input and output devices.

The network interface 1060 is an interface for connecting the display management device 10 to a network. This network is, for example, a local area network (LAN) or a wide area network (WAN). A method in which the network interface 1060 connects the display management device 10 to the network may be a wireless connection or a wired connection.

An example of a hardware configuration of the first terminal 20 is also as illustrated in FIG. 5.

Figure 6:
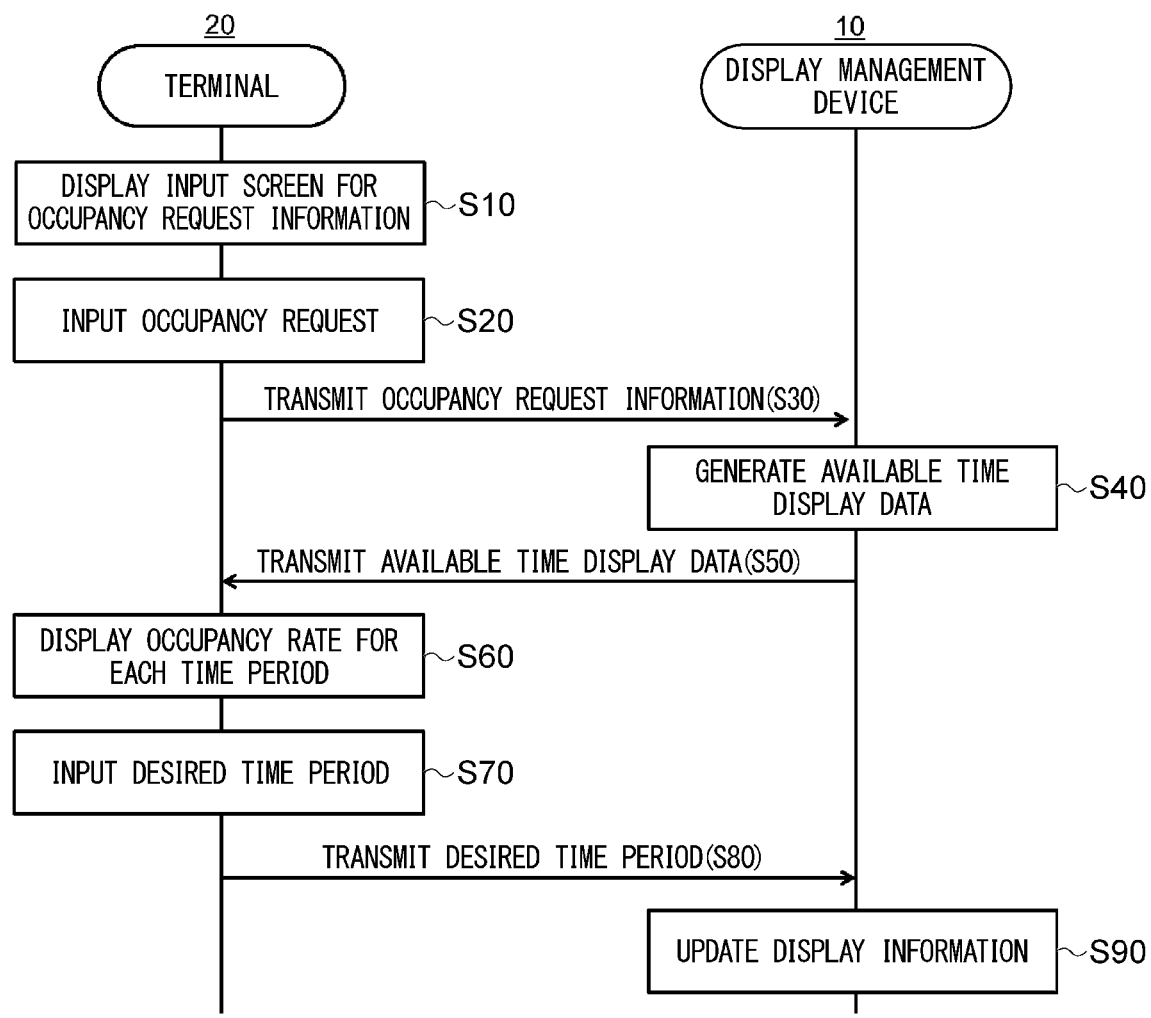
FIG. 6 is a flowchart illustrating an example of an operation of the display management device and the first terminal.

FIG. 6 is a flowchart illustrating an example of an operation of the display management device 10 and the first terminal 20. In the example illustrated in FIG. 6, the user of the first terminal 20 (for example, the content provider) causes the first terminal 20 to display an input screen for the occupancy request information (step S10). This process is performed, for example, by launching software installed on the first terminal 20 in advance. However, this process may be performed by the first terminal 20 accessing the display management device 10 and acquiring data for displaying the input screen from the display management device 10.

Then, the user of the first terminal 20 inputs the occupancy request information to the first terminal 20 (step S20). The occupancy request information includes, for example, information for specifying a region that the user desires to occupy (hereinafter referred to as desired region specifying information), and information for specifying a date and time (hereinafter referred to as desired date and time specifying information). A width of time indicated by the desired date and time specifying information is an integral multiple (including one) of a width of a time period that is managed by the display information storage 130. Further, the occupancy request information may include attribute information required for the display. The information included in this attribute information is, for example, at least one of the information described with reference to FIG. 2. Further, the occupancy request information may include a lower limit value of a desired occupancy rate.

Then, the input 210 of the first terminal 20 transmits the input the occupancy request information to the display management device 10 (step S30).

The acquisitioner 110 of the display management device 10 acquires the occupancy request information transmitted from the first terminal 20. Then, the data processor 120 of the display management device 10 generates the available time display data using the data stored in the display information storage 130 (step S40).

For example, when the display information storage 130 has data structures illustrated in FIGS. 2 and 3, the data processor 120 selects displays having region specifying information satisfying the desired region specifying information included in the occupancy request information, calculates the number of selected displays, and calculates the number of displays of which a date and time corresponding to desired date and time information are available among the number of selected displays. The data processor 120 divides the number of available displays by the number of selected displays and calculates the occupancy rate based on that number. The data processor 120 generates data for displaying this occupancy rate as available time display data. Here, the data processor 120 may include the number of selected displays and the number of available displays in the available time display data together with the occupancy rate or instead of the occupancy rate.

As described above, the attribute information stored in the display information storage 130 includes the sizes of the screens. Therefore, the data processor 120 may display an occupancy rate based on the sizes of the screens in place of or together with the occupancy rate based on the number of displays. In this case, the data processor 120 reads the sizes of the screens of the respective selected displays from the display information storage 130, and adds up the read sizes of screens (first addition result). Further, the data processor 120 adds up the sizes of the screens of the available displays (second addition result). The data processor 120 divides the second first addition result by the second addition result to calculate the occupancy rate based on the size of the screen.

Here, when the occupancy request information includes the attribute information required for the display, the data processor 120 selects only displays of which the attribute information satisfies the occupancy request information when selecting the displays.

For example, when a lower limit of the size of the screen is included in the occupancy request information, the data processor 120 selects displays of which the size of the screen is equal to or larger than this lower limit, and forms a population at the time of calculating the occupancy rate.

Further, when rain in a weather forecast and people being expected to gather during rainy weather are selected in the occupancy request information, the data processor 120 selects only displays of which the attribute information satisfies these conditions.

Further, when the display information storage 130 has a data structure illustrated in FIG. 4, the data processor 120 reads an occupancy rate corresponding to the desired region specifying information and the desired date and time specifying information included in the occupancy request information from the display information storage 130. The data processor 120 generates data for displaying the read occupancy rate, as the available time display data.

When the occupancy request information includes a lower limit value of an occupancy rate desired by the content provider, the data processor 120 selects a time period in which the occupancy rate is equal to or higher than the lower limit value in a date and time corresponding to desired date and time information, and includes the occupancy rate and/or the number of available displays in the available time display data only for the selected time period. Here, the number of displays selected in step S40 (that is, a denominator at the time of calculating the occupancy rate) may be included in the available time display data together with the number of available displays (that is, a numerator at the time of calculating the occupancy rate).

Then, the data processor 120 transmits the available time display data to the first terminal 20 (step S50).

When the display processor 220 of the first terminal 20 receives the available time display data, the display processor 220 uses the available time display data to display the occupancy rate and/or the number of available displays for each time period (step S60). The user of the first terminal 20 performs an input for selecting a desired time period on the first terminal 20 (step S70). The input 210 of the first terminal 20 transmits information for specifying an input time period, that is, the time period selection information, to the display management device 10 (step S80).

When the display information updater 140 of the display management device 10 receives the time period selection information, the display information updater 140 changes the time period indicated by the time period selection information to a state in which there is no available display (step S90). In this case, the display information updater 140 performs a process for allowing the user of the first terminal 20 to occupy all of the displays that are positioned in the first region and of which the time period indicated by the time period selection information is available. This process includes, for example, a process of updating a display schedule for each display.

Figure 7:
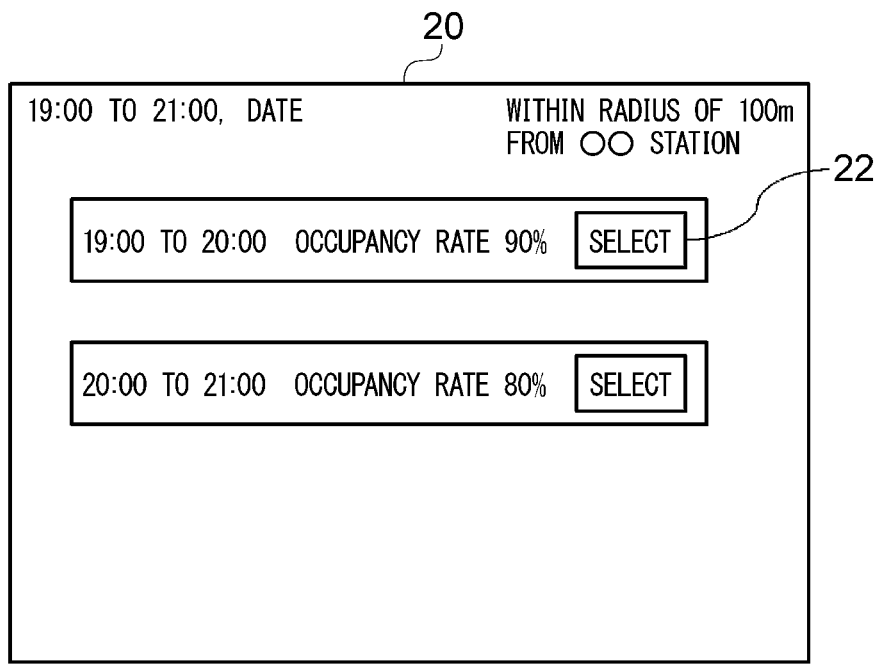
FIG. 7 is a diagram illustrating an example of a screen that is displayed by the first terminal in step S60.

FIG. 7 is a diagram illustrating an example of a screen that is displayed by the first terminal 20 in step S60. In the example illustrated in FIG. 7, the first terminal 20 displays an occupancy rate for each time period together with the region and the date and time desired by the user of the first terminal 20. The first terminal 20 also displays a button 22 for selecting each time period. The time period selection information can be input to the first terminal 20 by this selection button being selected with a mouse or the like.

The available time display data may include information for specifying a position of an available display (for example, latitude and longitude information). In this case, the display processor 220 of the first terminal 20 may display a map of a region including the desired region information input by the user in step S10 and display the position of the available display in this map. In this case, the display processor 220 may display at least a part of the attribute information of the display, such as the range of the standing positions in which the screen can be viewed or the information indicating the popularity of each available display. The information to be displayed is included in, for example, the available time display data.

As described above, according to the present embodiment, when the acquisitioner 110 of the display management device 10 acquires the occupancy request information from the first terminal 20, the data processor 120 of the display management device 10 selects a plurality of displays satisfying the condition included in the occupancy request information. The data processor 120 causes the first terminal 20 to display at least one of the number of displays that can be occupied by the user of the first terminal 20 and a rate thereof among the plurality of selected displays. Therefore, when the user of the first terminal 20, that is, the content provider, desires to occupy the displays, it is possible to decrease the number of communications between the display management device 10 and the first terminal 20. As a result, it is possible to reduce a load of the display management device 10. Further, the content provider or an agent thereof can efficiently search for an availability situation of the displays for each region and time period.

Second Embodiment

A display management device 10 according to the present embodiment has the same configuration as the display management device 10 according to the first embodiment except for content of the available time display data that the data processor 120 transmits to the first terminal 20, and a method for generating the available time display data.

In the present embodiment, the display information storage 130 stores information for specifying a display set 32, in addition to the information illustrated in the first embodiment. The display set 32 is a set of a plurality of displays 30. This display set 32 is set, for example, on the basis of a high likelihood of one person viewing the displays at the same time. As illustrated in the upper left of FIG. 8, the display set 32 includes, for example, two or more continuously disposed displays 30. Here, it is preferable for "a relative distance between adjacent displays 30 is equal to or smaller than a reference value" to be included as a condition for inclusion of the display 30 in the display set 32. Further, the display set 32 may include two or more displays 30 facing each other across a road, as shown on the right side of FIG. 8.

Figure 9:
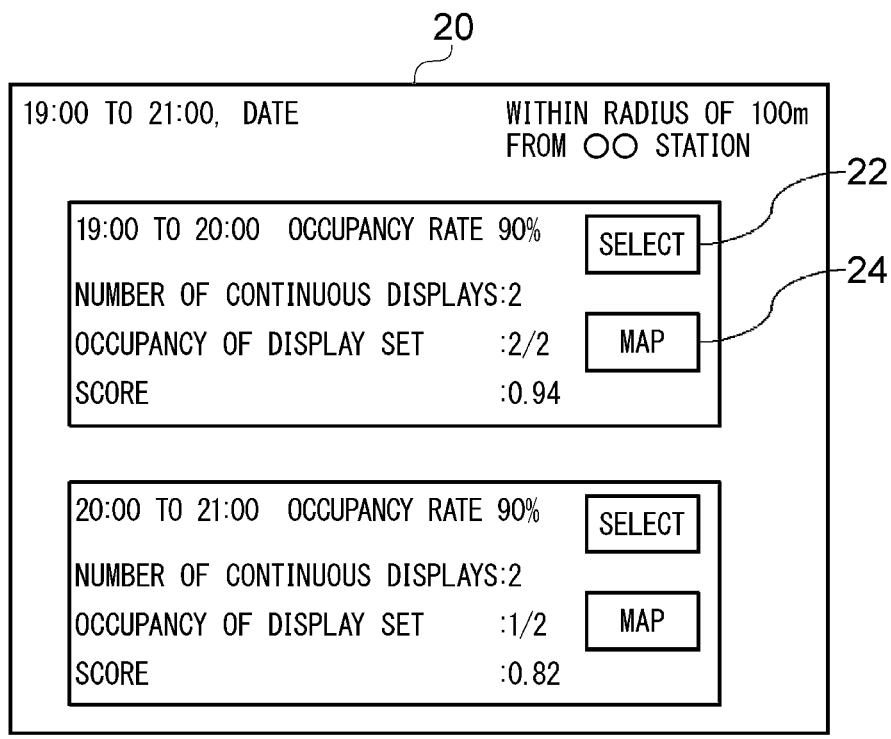
FIG. 9 is a diagram illustrating an example of available time display data that is displayed on the first terminal in a second embodiment.

FIG. 9 illustrates an example of the available time display data that is displayed on the first terminal 20 in the present embodiment, that is, a display example in step S60 of FIG. 6. In the present embodiment, the available time display data that the data processor 120 transmits to the first terminal 20 includes the following, in addition to the available time display data illustrated in FIG. 7. The data processor 120 generates this data.

First, the available time display data includes information indicating that there is no content display schedule in any of the displays 30 included in the display set 32 in a certain time period when no such schedule exists. This information is also information indicating whether or not the displays 30 constituting the display set 32 can be occupied. In the example illustrated in FIG. 9, this information includes the number of display sets 32 included in a region that is a target, and the number of display sets 32 that can be occupied.

The reason for displaying whether or not the display set 32 can be occupied is that it is assumed that effects of an advertisement will be enhanced when the display set 32 can be occupied.

Further, the available time display data includes the number of positionally continuous displays 30 (hereinafter referred to as a continuous number) among the displays 30 that are available in the time period. For example, in the example illustrated in FIG. 8, "the number of positionally continuous displays" is the same as the number of displays 30 included in the upper left display set 32. Here, it is preferable for "a distance from an adjacent display 30 is equal to or smaller than a reference" to be included as a condition for determining "continuous." The data processor 120 generates this data using position information of the displays 30 stored in the display information storage 130.

The reason for displaying the number of continuous displays 30 is that it is assumed that the effects of the advertisement increase as the number of displays 30 increases.

Further, in the present embodiment, the data processor 120 calculates a score based on an occupancy situation for each time period, and includes this score in the available time display data. This score is calculated using a coefficient based on an installation environment of the available displays 30. For example, the data processor 120 calculates a reciprocal (1/N) of the number (N) of the selected displays 30. The data processor 120 specifies a coefficient of the display 30 for each available display 30. The data processor 120 performs a process of multiplying the above reciprocal by each coefficient, and sets a sum of results of these multiplications as a score. This score also serves as a basis for the user of the first terminal 20 to determine whether or not to display content on the display 30.

The coefficient used by the data processor 120 is stored in the display information storage 130 as attribute information of the display 30, for example. There are various references for setting the coefficient. For example, the data processor 120 increases the coefficient when the display set 32 can be occupied. Further, the data processor 120 increases the coefficient as the number of continuous displays increases. Further, the data processor 120 increases the coefficient as an area of the available display 30 increases.

Further, in the present embodiment, a screen displayed on the first terminal 20 on the basis of the available time display data includes a button 24 for displaying a map. The button 24 is displayed for each time period. When the button 24 is selected in the first terminal 20, the first terminal 20 transmits information indicating this to the display management device 10 together with information for specifying the time period. Then, the data processor 120 of the display management device 10 includes positions of the displays 30 available in the time period in map data and then transmits the map data to the first terminal 20. The first terminal 20 displays the received map data. In the present embodiment, the display information storage 130 also stores the map data.

Figure 10:
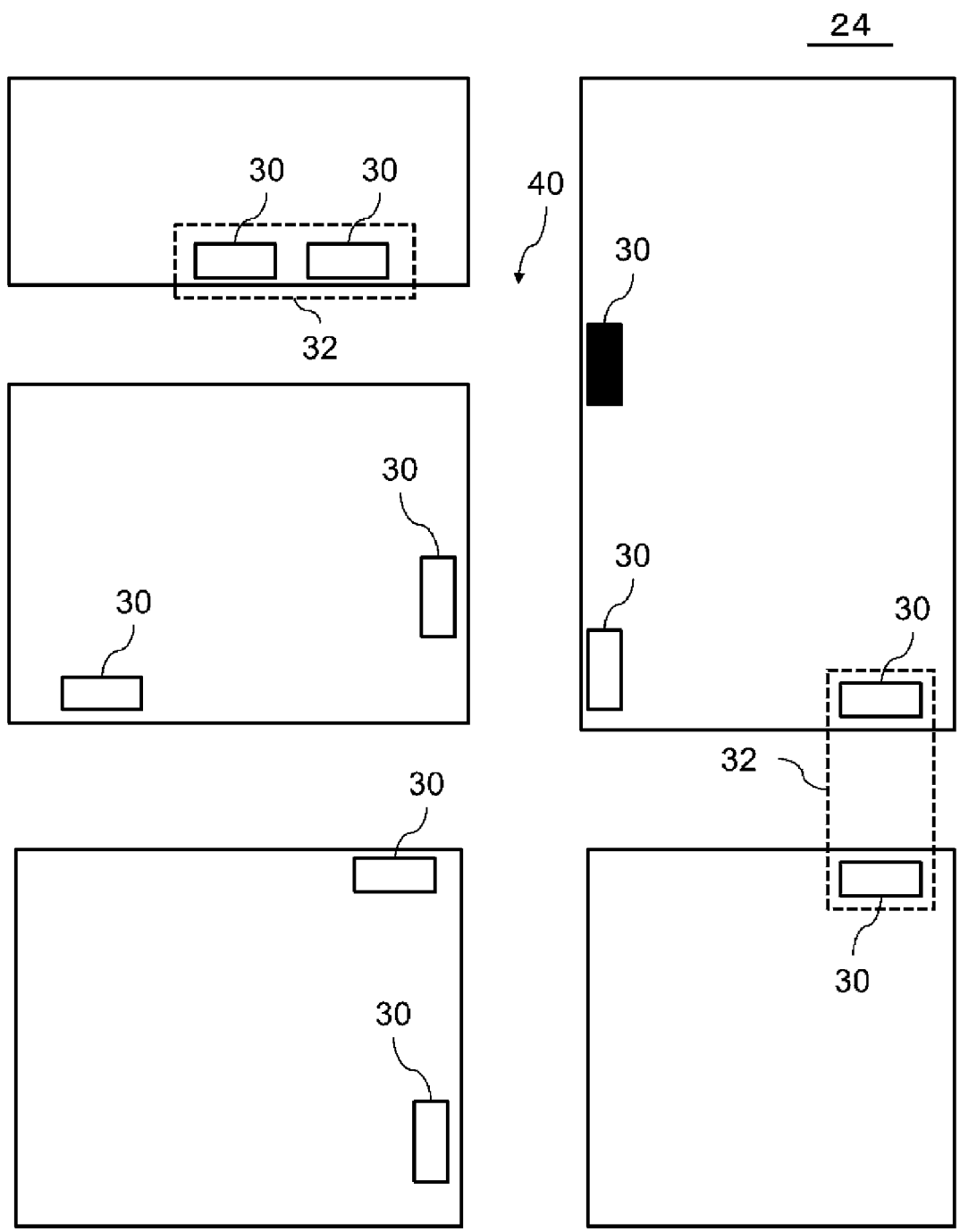
FIG. 10 illustrates an example of a map that is displayed on the first terminal.

FIG. 10 illustrates an example of a map that is displayed on the first terminal 20. In the example illustrated in FIG. 10, the map data includes a map of a target region and the positions of the displays 30 disposed in the region. Here, the positions of the displays 30 are displayed in a state in which it can be visually ascertained whether or not the displays 30 are available. For example, the available display 30 and the reserved display 30 differ in at least one of pattern, color, size, and shape. Accordingly, the administrator of the first terminal 20 can visually ascertain an occupancy situation of the displays 30.

Figure 8:
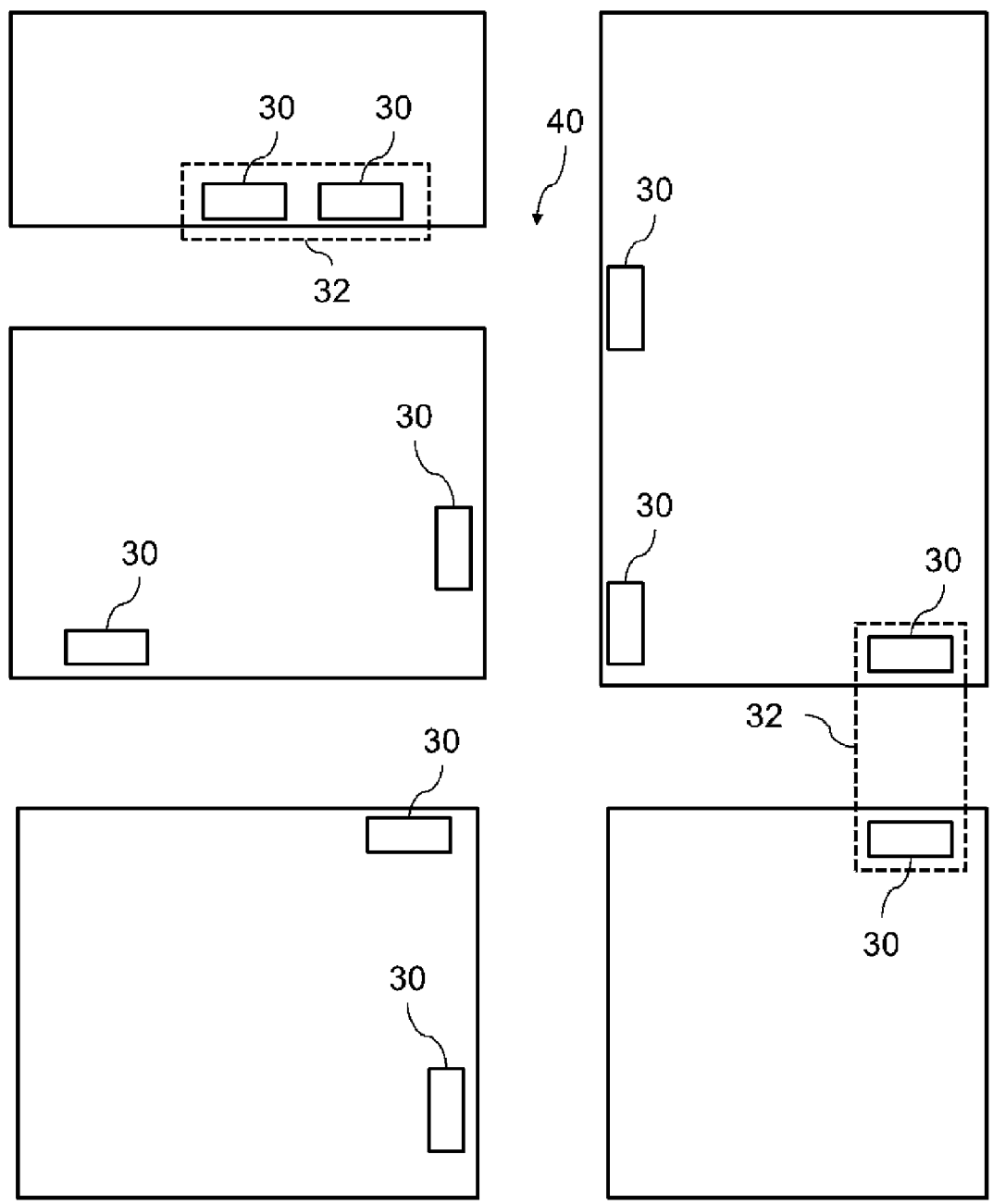
FIG. 8 is a diagram illustrating a set of displays.

In the present embodiment, the data processor 120 may cause the first terminal 20 to display the map illustrated in FIG. 8 before causing the first terminal 20 to display the screen illustrated in FIG. 9. In this case, the displays 30 constituting the display set 32 can be selected. When the user of the first terminal 20 selects any of the displays 30 included in the display set 32, information for specifying the display set 32 may be transmitted to the display management device 10. In this case, the data processor 120 of the display management device 10 generates information indicating a reserved state of the selected display set 32 and causes the first terminal 20 to display the information.

Third Embodiment

A display management device 10 according to the present embodiment also has a function of selecting the displays 30 serving as the population at the time of calculating the occupancy rate on the basis of a selected position of a person who views the display 30 when the position of the person is selected, in addition to the functions shown in any of the above embodiments.

Figure 11:
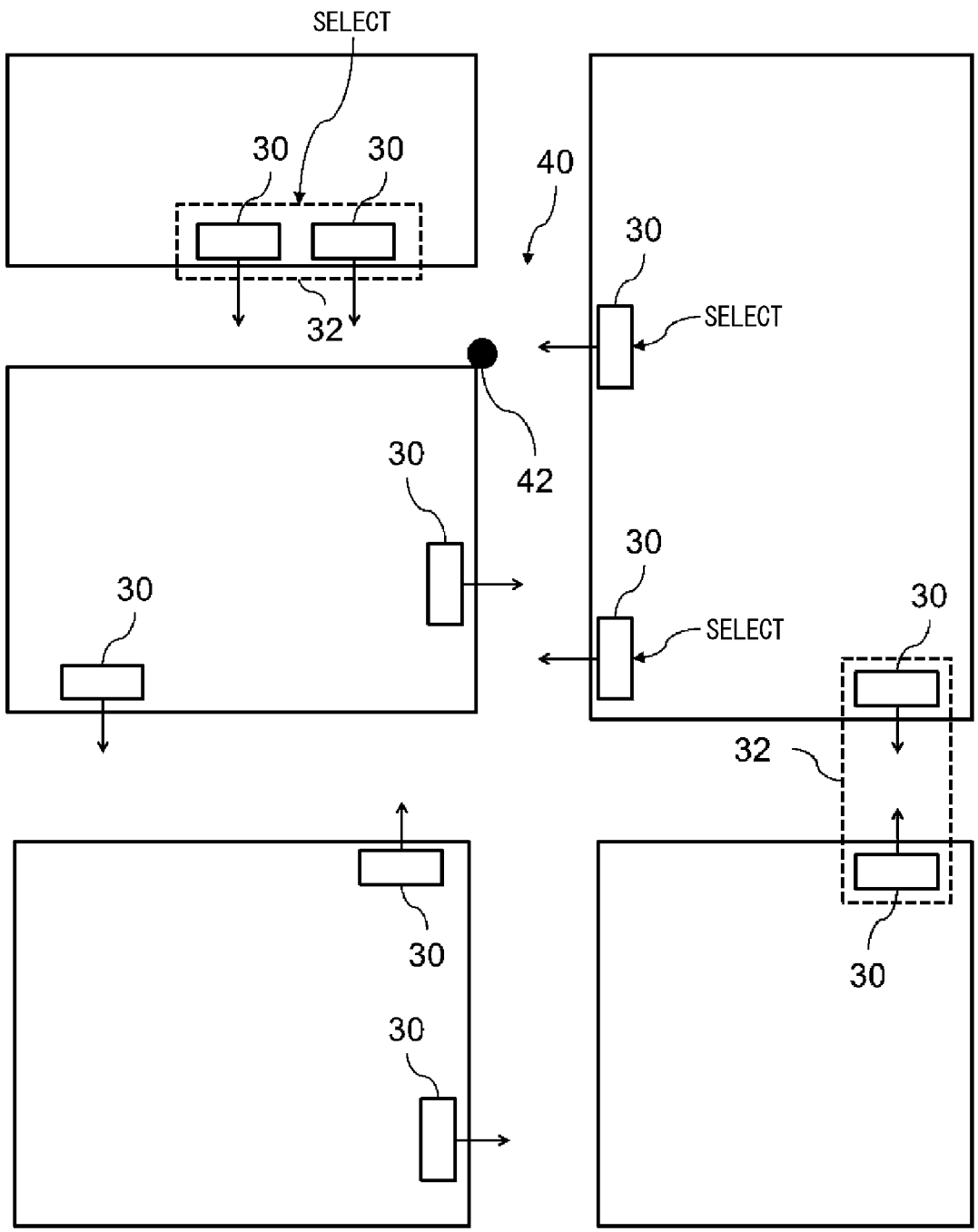
FIG. 11 is a diagram illustrating an example of a process of a data processor in a third embodiment.

FIG. 11 is a diagram illustrating an example of a process of the data processor 120 in the present embodiment. As shown in the first embodiment, the attribute information of the display 30 stored in the display information storage 130 includes a direction of the screen. The user of the first terminal 20 inputs information for specifying a position of a person who views the display 30 to the first terminal 20. Then, the first terminal 20 transmits this information to the display management device 10 as a part of the occupancy request information. Then, the data processor 120 of the display management device 10 uses a position received from the first terminal 20, the map data stored in the display information storage 130, and a direction of the display 30 to select the displays 30 that can be viewed from that position.

For example, the data processor 120 specifies the road on which the position exists using a position of a road included in the map data and the position received from the first terminal 20. The data processor 120 specifies a range visible from the position on both sides of the specified road. The data processor 120 selects the display 30 of which the screen is directed to the road from among the displays 30 included in the specified range. In the example illustrated in FIG. 11, the user of the first terminal 20 selects a corner of a junction. Then, the data processor 120 selects the displays 30 within a reference distance from the selected position among the displays 30 facing roads constituting the junction.

Further, the data processor 120 may select the displays 30 serving as the population at the time of calculating the occupancy rate using an angle formed by a straight line connecting a position of the display 30 to a position of a person who views the display 30 and a direction of the screen of the display 30. For example, the data processor 120 may select the display 30 of which the angle is equal to or smaller than a reference value (for example, 30° or less).

According to the present embodiment, it is possible to further limit a place and calculate the occupancy rate.

Fourth Embodiment

A display management device 10 according to the present embodiment is the same as the display management device 10 according to any of the above-described embodiments, except that attribute information of a requester who has made a reservation, such as a type of business, is included in the available time display data when the occupancy rate is not 100%, that is, when at least one of the plurality of displays 30 constituting the population has already been reserved.

Figures 12, 13:
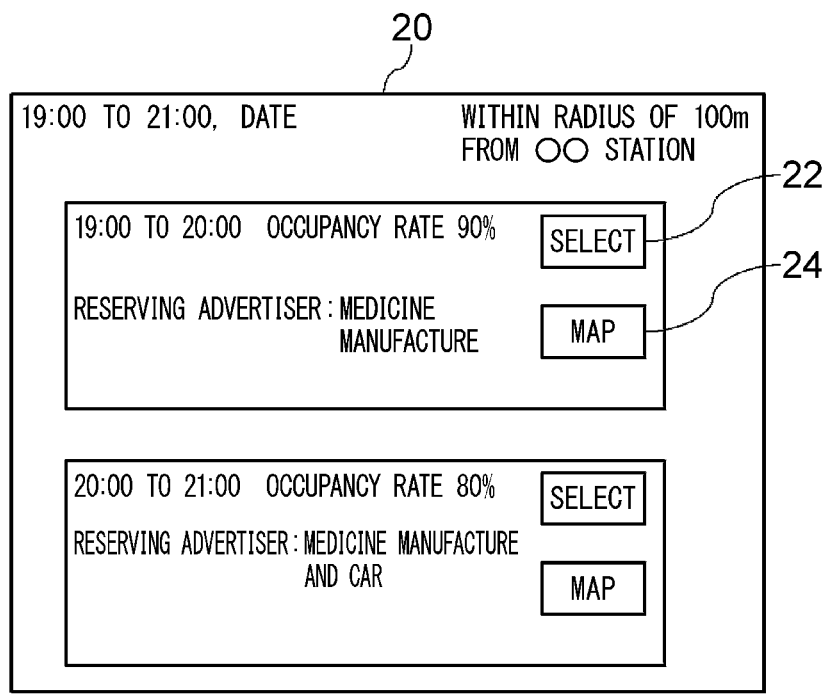
FIG. 12 is a diagram illustrating details of reservation information stored in a display information storage according to a fourth embodiment.
FIG. 13 is a diagram illustrating an example of available time display data that is displayed on the first terminal in the fourth embodiment.

FIG. 12 is a diagram illustrating details of the reservation information stored in the display information storage 130 according to the present embodiment. In the example illustrated in FIG. 12, the reservation information is stored for each display 30. The reservation information includes information indicating whether or not there is a reservation for content display for each time period. Further, when there has been reservation, the reservation information includes the attribute information of the requester who has made the reservation. For example, the display information storage 130 acquires this attribute information when the reservation has been made.

FIG. 13 illustrates an example of the available time display data that is displayed on the first terminal 20 in the present embodiment, that is, a display example of step S60 illustrated in FIG. 6. In the example illustrated in FIG. 13, when the occupancy rate is not 100%, the data processor 120 reads attribute information (for example, a type of business) of a requester of the displays 30 that have already been reserved, from the display information storage 130. The read attribute information is included in the available time display data, and the available time display data is transmitted to the first terminal 20. The first terminal 20 performs a display according to the available time display data. This display includes the attribute information of the requester of the displays 30 that have already been reserved.

When content to be displayed has been an advertisement, effects of the advertisement may be reduced depending on content of advertisements that is displayed around the advertisement. According to the present embodiment, when the occupancy rate has not been 100%, the user of the first terminal 20 can confirm attribute information of requesters of the displays 30 which have already been reserved. Therefore, materials for determining whether or not content is to be displayed on the displays 30 increases.

Fifth Embodiment

In each of the above-described embodiments, the display management device 10 calculates the occupancy rate and/or the number of displays 30 from the places (desired region specifying information) and the date and time (desired date and time specifying information). On the other hand, in the present embodiment, when the data processor 120 of the display management device 10 acquires the places (desired region specifying information) and a condition regarding at least one of the number of displays capable of simultaneous display and a rate thereof (hereinafter referred to as an occupancy rate condition) from the first terminal 20, the data processor 120 specifies the time period matching these and includes information indicating the specified time periods in the available time display data.

For example, the data processor 120 reads data corresponding to the desired region specifying information acquired from the first terminal 20 from the display information storage 130, and calculates the occupancy rate and/or the number of available displays 30 for each time period. The time period in which the calculated occupancy rate and/or the calculated number of displays 30 satisfies the occupancy rate condition is selected, and only information indicating the selected time period is included in the available time display data. Here, when the occupancy rate condition is indicated by the occupancy rate, the occupancy rate condition may be 100% or may be a value greater than 0 and smaller than 100%.

In the present embodiment, the user of the first terminal 20 may transmit information for specifying the display 30 on which content is to be necessarily displayed to the display management device 10 together with the desired region specifying information or in place of the desired region specifying information. In this case, the data processor 120 may select the displays 30 as the population by using the information for specifying the display 30 received from the first terminal 20. For example, the data processor 120 sets the display 30 selected by the user of the first terminal 20 and the display 30 positioned in a reference range from the selected display 30 as a population.

Figure 14:
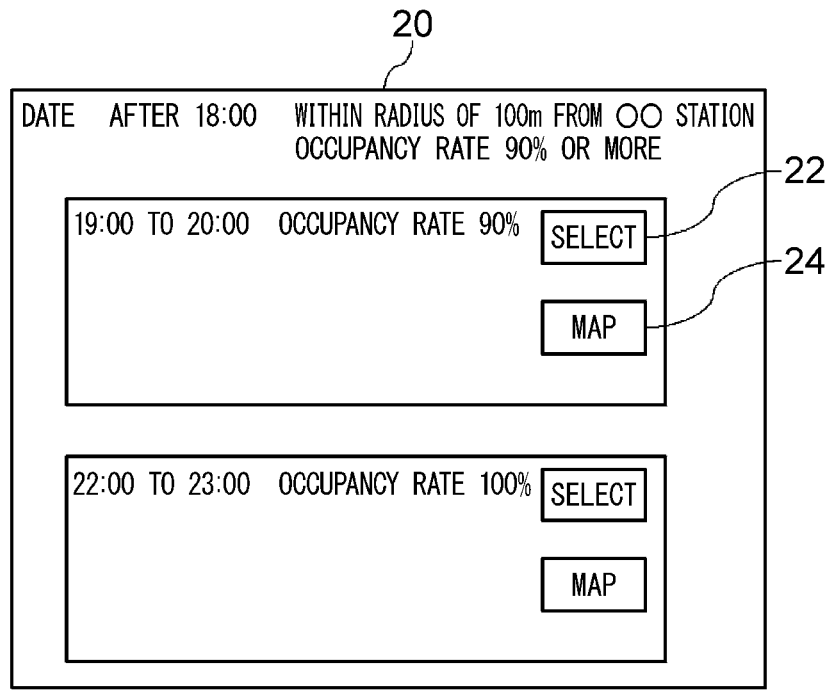
FIG. 14 is a diagram illustrating an example of available time display data that is displayed on the first terminal in a fifth embodiment.

FIG. 14 illustrates an example of available time display data that is displayed on the first terminal 20 in the present embodiment, that is, the display example of step S60 illustrated in FIG. 6. In the example illustrated in FIG. 14, the user of the first terminal 20 transmits a desired time period to the display management device 10 through the first terminal 20, in addition to places (desired region specifying information) and conditions (for example, a lower limit) of the desired occupancy rate. The first terminal 20 can selectively display a time period satisfying the occupancy rate condition among the time periods desired by the user. When the time period is selected, a reservation process is performed on all of the available displays 30 among the displays 30 included in the selected time period with respect to the region corresponding to the desired region specifying information.

According to the present embodiment, it is also possible to decrease the number of communications between the display management device 10 and the first terminal 20 when the content provider desires to occupy the displays.

Sixth Embodiment

In the present embodiment, when the data processor 120 of the display management device 10 acquires the date and time (desired date and time specifying information) and the occupancy rate condition shown in the fifth embodiment from the first terminal 20, the data processor 120 selects a region matching these and enables information on the selected region to be recognized in the available time display data.

For example, the data processor 120 reads the data corresponding to the desired date and time specifying information (first time period) acquired from the first terminal 20 from the display information storage 130, and calculates the occupancy rate and/or the number of available displays 30 for each place. The data processor 120 selects a region in which the calculated occupancy rate and/or the calculated number of displays 30 satisfies the occupancy rate condition acquired from the first terminal 20, and enables information on the selected region to be recognized in the available time display data. For example, the available time display data may include only the information on the selected region.

Figure 15:
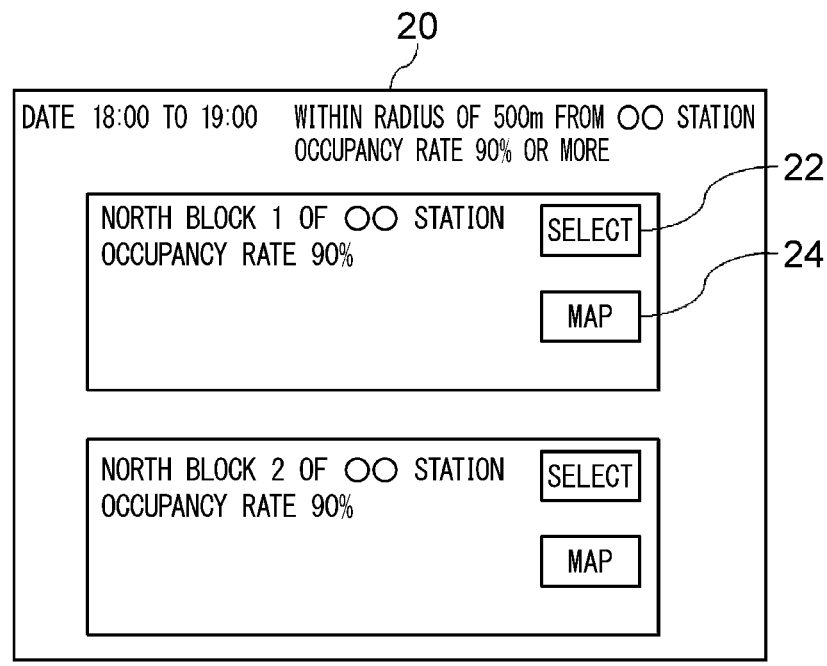
FIG. 15 is a diagram illustrating an example of available time display data that is displayed on the first terminal in a sixth embodiment.

FIG. 15 illustrates an example of available time display data that is displayed on the first terminal 20 in the present embodiment, that is, the display example of step S60 illustrated in FIG. 6. In the example illustrated in FIG. 15, the user of the first terminal 20 transmits a desired region to the display management device 10 through the first terminal 20, in addition to the date and time (desired date and time specifying information) and the conditions (for example, the lower limit) of the desired occupancy rate. The first terminal 20 selectively displays a region satisfying the occupancy rate condition among the regions desired by the user. When the region is selected, a reservation process is performed for all of the available displays 30 among the displays 30 included in the selected region with respect to a time period corresponding to the desired date and time specifying information.

According to the present embodiment, it is also possible to decrease the number of communications between the display management device 10 and the first terminal 20 when the content provider desires to occupy the displays.

Although the present embodiments of the present invention have been described above with reference to the drawings, these are examples of the present invention, and various configurations other than the above can be adopted.

Further, in the plurality of flowcharts used in the above description, a plurality of steps (processes) are described in order, but an execution order of the steps executed in each embodiment is not limited to the described order. In each embodiment, the order of the illustrated steps can be changed as long as there is no problem in terms of content. Further, the above-described embodiments can be combined as long as pieces of content do not conflict with each other.

Some or all of the above embodiments may also be described as in the following supplements, but not limited to:

1. A display management device including:
    an acquisitioner configured to acquire occupancy request information for requesting content to be displayed on a plurality of displays positioned in a first region from a first terminal; and
        a data processor configured to, when the occupancy request information is acquired, generate available time display data for displaying a screen showing availability information for each time period, the availability information including at least one of the number of displays reservable for simultaneous display and a rate thereof among the plurality of displays using a display information storage configured to store information on available times of the plurality of displays, and transmit the available time display data to the first terminal.

2. The display management device according to 1,
    wherein the display information storage stores information for specifying an available date and time for each of the plurality of displays, and
        the data processor uses the display information storage to generate the availability information for each time period.

3. The display management device according to 2,
    wherein the display information storage stores attribute information of the display,
    the occupancy request information includes the attribute information to be satisfied by the display on which the content is to be displayed, and
    the data processor selects the displays corresponding to the attribute information included in the occupancy request information, and sets the selected displays as a population to generate the availability information.

4. The display management device according to 1,
    wherein the display information storage stores the availability information for each time period.

5. The display management device according to any one of 1 to 4, wherein the data processor selects a time period in which at least one of the number of displays reservable for simultaneous display and a rate thereof satisfies a reference and includes the time period in the available time display data.

6. The display management device according to any one of 1 to 5, further including:
    a display information updater configured to update the display information storage when time period selection information for specifying a time period selected after the data processor has transmitted the available time display data is received, and change the time period indicated by the time period selection information to a state in which there are no displays reservable for simultaneous display.

7. The display management device according to 6,
    wherein the display information updater acquires a content display schedule and stores the content display schedule in a storage for the display updated from a state in which there is no content display schedule to a state in which there is a content display schedule.

8. The display management device according to 7,
    wherein the display schedule of the plurality of displays stored in the storage indicates that the same content is displayed on a certain rate or more of displays among the plurality of displays at the same timing.

9. The display management device according to any one of 1 to 8,
    wherein the display information storage stores position information indicating a position of the display for each of the plurality of displays,
    the occupancy request information includes region specifying information for specifying the first region, and
    the data processor uses the position information stored in the display information storage to select the plurality of displays corresponding to the region specifying information included in the occupancy request information.

10. The display management device according to any one of 1 to 9,
    wherein the display information storage includes information for specifying a display set including a plurality of the displays, and
    the data processor includes information indicating that there is no content display schedule in the time period in all of the displays included in the display set, in the available time display data, when there is no content display schedule in the time period in all of the displays included in the display set.

11. The display management device according to any one of 1 to 10,
    wherein the display information storage includes information indicating positions of the displays, and
    the data processor includes information indicating the number of positionally continuous displays among the displays reservable for simultaneous display in the time period, in the available time display data.

12. The display management device according to any one of 1 to 11, wherein the data processor calculates a score for each time period using a coefficient based on an installation environment of the displays reservable for simultaneous display, and includes the score in the available time display data.

13. The display management device according to any one of 1 to 12, wherein the data processor transmits map data for displaying positions of displays reservable for simultaneous display on a map to the first terminal.

14. The display management device according to any one of 1 to 13,
    wherein the data processor
    acquires position information indicating a selected position,
    selects the displays visible from the position indicated by the position information using the position information, map data including a position of a road, and information indicating a position of the display and a direction of the screen, and
    sets the selected displays as a population to generate the availability information.

15. The display management device according to any one of 1 to 14,
    wherein the display information storage stores information indicating whether or not there is a reservation for a display of the content for each display and time period, and also stores attribute information of a requester who has made the reservation when there is the reservation, and
    the data processor includes the attribute information of the requester who has made the reservation for a display in the available time display data when there is the reserved display.

16. The display management device according to any one of 1 to 15, wherein the occupancy request information further includes an occupancy rate condition, the occupancy rate condition being a condition regarding at least one of the number of displays capable of simultaneous display and a rate thereof, and the data processor further selects a time period in which at least one of the number of displays without a content display schedule and a rate thereof satisfies the occupancy rate condition, and includes the availability information in the selected time period in the availability information display data.

17. A display management device including:

an acquisitioner configured to acquire, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and a data processor configured to select a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generate available time display data for displaying the selected regions and time periods, and transmit the available time display data to the first terminal.

18. A display management method including:

acquiring, by a computer, from a first terminal, occupancy request information indicating that content is requested to be displayed on a plurality of displays positioned in a first region; and generating, by the computer, available time display data for displaying a screen showing availability information including at least one of the number of displays reservable for simultaneous display and a rate thereof among the plurality of displays for each time period using a display information storage configured to store information on available times of the plurality of displays when the occupancy request information is acquired, and transmitting the available time display data to the first terminal.

19. The display management method according to 18, wherein the display information storage stores information for specifying an available date and time for each of the plurality of displays, and the computer uses the display information storage to generate the availability information for each time period.

20. The display management method according to 19, wherein the display information storage stores attribute information of the display, the occupancy request information includes the attribute information to be satisfied by the display on which the content is to be displayed, and the computer selects the displays corresponding to the attribute information included in the occupancy request information, and sets the selected displays as a population to generate the availability information.

21. The display management device according to 18, wherein the display information storage stores the availability information for each time period.

22. The display management method according to any one of 18 to 21, wherein the computer selects a time period in which at least one of the number of displays reservable for simultaneous display and a rate thereof satisfies a reference and includes the time period in the available time display data.

23. The display management method according to any one of 18 to 22, wherein the computer updates the display information storage when time period selection information for specifying a time period selected after the available time display data has been transmitted is received, and changes the time period indicated by the time period selection information to a state in which there are no displays reservable for simultaneous display.

24. The display management device according to 23, wherein the computer acquires a content display schedule and stores the content display schedule in a storage for the display updated from a state in which there is no content display schedule to a state in which there is a content display schedule.

25. The display management method according to 24, wherein the display schedule of the plurality of displays stored in the storage indicates that the same content is displayed on a certain rate or more of displays among the plurality of displays at the same timing.

26. The display management method according to any one of 18 to 25, wherein the display information storage stores position information indicating a position of the display for each of the plurality of displays, the occupancy request information includes region specifying information for specifying the first region, and the computer uses the position information stored in the display information storage to select the plurality of displays corresponding to the region specifying information included in the occupancy request information.

27. The display management method according to any one of 18 to 26, wherein the display information storage includes information for specifying a display set including a plurality of the displays, and the computer includes information indicating that there is no content display schedule in the time period in all of the displays included in the display set, in the available time display data, when there is no content display schedule in the time period in all of the displays included in the display set.

28. The display management method according to any one of 18 to 27, wherein the display information storage includes information indicating positions of the displays, and the computer includes information indicating the number of positionally continuous displays among the displays reservable for simultaneous display in the time period, in the available time display data.

29. The display management method according to any one of 18 to 28, wherein the computer calculates a score for each time period using a coefficient based on an installation environment of the displays reservable for simultaneous display, and includes the score in the available time display data.

30. The display management method according to any one of 18 to 29, wherein the computer transmits map data for displaying positions of displays reservable for simultaneous display on a map to the first terminal.

31. The display management method according to any one of 18 to 30, wherein the computer acquires position information indicating a selected position, selects the displays visible from the position indicated by the position information using the position information, map data including a position of a road, and information indicating a position of the display and a direction of the screen, and sets the selected displays as a population to generate the availability information.

32. The display management method according to any one of 18 to 31, wherein the display information storage stores information indicating whether or not there is a reservation for a display of the content for each display and time period, and also stores attribute information of a requester who has made the reservation when there is the reservation, and the computer includes the attribute information of the requester who has made the reservation for a display in the available time display data when there is the reserved display.

33. The display management method according to any one of 8 to 32, wherein the occupancy request information further includes an occupancy rate condition, the occupancy rate condition being a condition regarding at least one of the number of displays capable of simultaneous display and a rate thereof, and the computer further selects a time period in which at least one of the number of displays without a content display schedule and a rate thereof satisfies the occupancy rate condition, and includes the availability information in the selected time period in the availability information display data.

34. A display management method including:

acquiring, by a computer, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and selecting, by the computer, a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generating available time display data for displaying the selected regions and time periods, and transmitting the available time display data to the first terminal.

35. A program causing a computer to have:

a function of acquiring, from a first terminal, occupancy request information indicating that content is requested to be displayed on a plurality of displays positioned in a first region; and a function of generating available time display data for displaying a screen showing availability information including at least one of the number of displays reservable for simultaneous display and a rate thereof among the plurality of displays for each time period using a display information storage configured to store information on available times of the plurality of displays when the occupancy request information is acquired, and transmitting the available time display data to the first terminal.

36. The program according to 35, wherein the display information storage stores information for specifying an available date and time for each of the plurality of displays, and the program causes the computer to use the display information storage to generate the availability information for each time period.

37. The program according to 36, wherein the display information storage stores attribute information of the display, the occupancy request information includes the attribute information to be satisfied by the display on which the content is to be displayed, and the program causes the computer to select the displays corresponding to the attribute information included in the occupancy request information, and set the selected displays as a population to generate the availability information.

38. The program according to 35, wherein the display information storage stores the availability information for each time period.

39. The program according to any one of 35 to 38, wherein the program causes the computer to perform a process of selecting a time period in which at least one of the number of displays reservable for simultaneous display and a rate thereof satisfies a reference and including the time period in the available time display data.

40. The program according to any one of 35 to 39, wherein the program causes the computer to update the display information storage when time period selection information for specifying a time period selected after the available time display data has been transmitted is received, and change the time period indicated by the time period selection information to a state in which there are no displays reservable for simultaneous display.

41. The program according to 40, wherein the program causes the computer to acquire a content display schedule and store the content display schedule in a storage for the display updated from a state in which there is no content display schedule to a state in which there is a content display schedule.

42. The program according to 41, wherein the display schedule of the plurality of displays stored in the storage indicates that the same content is displayed on a certain rate or more of displays among the plurality of displays at the same timing.

43. The program according to any one of 35 to 42, wherein the display information storage stores position information indicating a position of the display for each of the plurality of displays, the occupancy request information includes region specifying information for specifying the first region, and the program causes the computer to use the position information stored in the display information storage to select the plurality of displays corresponding to the region specifying information included in the occupancy request information.

44. The program according to any one of 35 to 43, wherein the display information storage includes information for specifying a display set including a plurality of the displays, and the program causes the computer to include information indicating that there is no content display schedule in the time period in all of the displays included in the display set, in the available time display data, when there is no content display schedule in the time period in all of the displays included in the display set.

45. The program according to any one of 35 to 44, wherein the display information storage includes information indicating positions of the displays, and the program causes the computer to include information indicating the number of positionally continuous displays among the displays reservable for simultaneous display in the time period, in the available time display data.

46. The program according to any one of 35 to 45, wherein the program causes the computer to calculate a score for each time period using a coefficient based on an installation environment of the displays reservable for simultaneous display, and include the score in the available time display data.

47. The program according to any one of 35 to 46, wherein the program causes the computer to transmit map data for displaying positions of displays reservable for simultaneous display on a map to the first terminal.

48. The program according to any one of 35 to 47, wherein the program causes the computer to acquire position information indicating a selected position, select the displays visible from the position indicated by the position information using the position information, map data including a position of a road, and information indicating a position of the display and a direction of the screen, and set the selected displays as a population to generate the availability information.

49. The program according to any one of 35 to 48, wherein the display information storage stores information indicating whether or not there is a reservation for a display of the content for each display and time period, and also stores attribute information of a requester who has made the reservation when there is the reservation, and the program causes the computer to include the attribute information of the requester who has made the reservation for a display in the available time display data when there is the reserved display.

50. The program according to any one of 35 to 49, wherein the occupancy request information further includes an occupancy rate condition, the occupancy rate condition being a condition regarding at least one of the number of displays capable of simultaneous display and a rate thereof, and the program causes the computer to further select a time period in which at least one of the number of displays without a content display schedule and a rate thereof satisfies the occupancy rate condition, and include the availability information in the selected time period in the availability information display data.

51. A program causing a computer to have:

a function of acquiring, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof; and a function of selecting a combination of regions and time periods in which at least one of the number of displays reservable for simultaneous display in the first time period and a rate thereof satisfies the occupancy rate condition using a display information storage configured to store information on installation places and available times of the plurality of displays when the occupancy request information is acquired, generating available time display data for displaying the selected regions and time periods, and transmitting the available time display data to the first terminal.

Priority is claimed on the international application PCT/JP2019/020913, filed May 27, 2019, the content of which is incorporated herein by reference.

REFERENCE SIGNS LIST

10 Display management device
20 First terminal
30 Display
32 Display set
110 Acquisitioner
120 Data processor
130 Display information storage
140 Display information updater
210 Input
220 Display processor

The invention claimed is:

1. A system, comprising:
a first terminal that comprises:
  a first memory;
  a first processor connected to the first memory; and
  a screen; and
a display management device comprising:
  a second memory; and
  a second processor connected to the second memory,
  wherein the second processor is configured to
  acquire occupancy request information for requesting content to be displayed on a plurality of displays positioned from the first terminal, the occupancy request information including desired region specifying information and desired date and time specifying information, the desired region specifying information being for specifying a region that a user desires to occupy, the desired date and time specifying information being for specifying date and time that the user desires to occupy;
  make the second memory store region specifying information and reservation information, the region specifying information being for specifying a region in which the plurality of displays are positioned, the reservation information being for specifying an available date and time of the plurality of displays; and
  when the occupancy request information is acquired, generate available time display data for displaying a graphical user interface showing availability information for each time period, the availability information including a plurality of the number of displays reservable for simultaneous display and a rate thereof among the plurality of displays using the desired region specifying information and the desired date and time specifying information included in the occupancy request information, and the region specifying information and the reservation information stored, and transmit the available time display data to the first terminal,
wherein the occupancy request information acquired from the first terminal, further comprises occupancy rate information as a percentage,
wherein occupacy request information acquired from the first terminal was transmitted from the first terminal in response to input from a user interacting with an input graphical user interface displayed on the first terminal;
wherein the first processor is configured to
receive the available time display data, analyze the received available time display data, and select a smaller subset of the plurality of displays to display on the screen; and
automatically display the graphical user interface showing the availability information for each time period, the availability information including at least one of the number of displays reservable for simultaneous display and the rate thereof among the plurality of displays using the available time display data.

2. The system according to claim 1, wherein the data processor uses the display information storage to generate the availability information for each time period.

3. The system according to claim 2, wherein the display information storage stores attribute information of the display,
the occupancy request information includes the attribute information to be satisfied by the display on which the content is to be displayed, and
the data processor selects the displays corresponding to the attribute information included in the occupancy request information, and sets the selected displays as a population to generate the availability information.

4. The system according to claim 1, wherein the display information storage stores the availability information for each time period.

5. The system according to claim 1, wherein the data processor selects a time period in which at least one of the number of displays reservable for simultaneous display and a rate thereof satisfies a reference and includes the time period in the available time display data.

6. The system according to claim 1, further comprising:
a display information updater configured to update the display information storage when time period selection information for specifying a time period selected after the data processor has transmitted the available time display data is received, and change the time period indicated by the time period selection information to a state in which there are no displays reservable for simultaneous display.

7. The system according to claim 6, wherein the display information updater acquires a content display schedule and stores the content display schedule in a storage for the display updated from a state in which there is no content display schedule to a state in which there is a content display schedule.

8. The system according to claim 7, wherein the display schedule of the plurality of displays stored in the storage indicates that the same content is displayed on a certain rate or more of displays among the plurality of displays at the same timing.

9. The system according to claim 1, wherein the display information storage stores position information indicating a position of the display for each of the plurality of displays,
the occupancy request information includes region specifying information for specifying the first region, and
the data processor uses the position information stored in the display information storage to select the plurality of displays corresponding to the region specifying information included in the occupancy request information.

10. The system according to claim 1, wherein the display information storage includes information for specifying a display set including a plurality of the displays, and
the data processor includes information indicating that there is no content display schedule in the time period in all of the displays included in the display set, in the available time display data, when there is no content display schedule in the time period in all of the displays included in the display set.

11. The system according to claim 1, wherein the display information storage includes information indicating positions of the displays, and
the data processor includes information indicating the number of positionally continuous displays among the displays reservable for simultaneous display in the time period, in the available time display data.

12. The system according to claim 1, wherein the data processor calculates a score for each time period using a coefficient based on an installation environment of the displays reservable for simultaneous display, and includes the score in the available time display data.

13. The system according to claim 1, wherein the data processor transmits map data for displaying positions of displays reservable for simultaneous display on a map to the first terminal.

14. The system according to claim 1, wherein the data processor
acquires position information indicating a selected position,
selects the displays visible from the position indicated by the position information using the position information, map data including a position of a road, and information indicating a position of the display and a direction of the screen, and
sets the selected displays as a population to generate the availability information.

15. The system according to claim 1, wherein the display information storage stores information indicating whether or not there is a reservation for a display of the content for each display and time period, and also stores attribute information of a requester who has made the reservation when there is the reservation, and
the data processor includes the attribute information of the requester who has made the reservation for a display in the available time display data when there is the reserved display.

16. The system according to claim 1, wherein the occupancy request information further includes an occupancy rate condition, the occupancy rate condition being a condition regarding at least one of the number of displays capable of simultaneous display and a rate thereof, and
the data processor further selects a time period in which at least one of the number of displays without a content display schedule and a rate thereof satisfies the occupancy rate condition, and includes the availability information in the selected time period in the availability information display data.

17. The system according to claim 1, wherein the second memory stores information on the available time of the plurality of displays positioned in a first region.

18. A system, comprising:
a first terminal that comprises:
a first memory;
a first processor connected to the first memory; and
a screen; and
a display management device comprising:
a second memory; and
a second processor connected to the second memory,
wherein the second processor is configured to
acquire, from the first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof;

make the second memory store region specifying information and reservation information, the region specifying information being for specifying a region in which the plurality of displays are positioned, the reservation information being for specifying an available date and time of the plurality of displays; and select a combination of regions and time periods in which a plurality of the number of displays reservable for simultaneous display in the first time period and a rate thereof satisfies the occupancy rate condition using the region specifying information and the reservation information stored when the occupancy request information is acquired, generate available time display data for displaying the selected regions and time periods, and transmit the available time display data to the first terminal, wherein the occupancy request information acquired from the first terminal, further comprises occupancy rate information as a percentage, wherein occupancy request information acquired from the first terminal was transmitted from the first terminal in response to input from a user interacting with an input graphical user interface displayed on the first terminal;

wherein the first processor is configured to:

receive the available time display data, analyze the received available time display data, and select a smaller subset of the plurality of displays to display on the screen; and automatically display the graphical user interface showing the availability information for each time period, the availability information including at least one of the number of displays reservable for simultaneous display and the rate thereof among the plurality of displays using the available time display data.

19. A display management method for a system, comprising a first terminal including a first memory, a first processor connected to the first memory, and a screen, and a display management device, including a second memory, and second processor connected to the second memory, the method comprising:

acquiring, by the second processor, from a first terminal, occupancy request information indicating that content is requested to be displayed on a plurality of displays positioned, the occupancy request information including desired region specifying information and desired date and time specifying information, the desired region specifying information being for specifying a region that a user desires to occupy, the desired date and time specifying information being for specifying date and time that the user desires to occupy;

making the second memory store region specifying information and reservation information, the region specifying information being for specifying a region in which the plurality of displays are positioned, the reservation information being for specifying an available date and time of the plurality of displays; and generating, by the second processor, available time display data for displaying a graphical user interface showing availability information including a plurality of the number of displays reservable for simultaneous display and a rate thereof among the plurality of displays for each time period using the desired region specifying information and the desired date and time specifying information included in the occupancy request information, and the region specifying information and the reservation information stored, and transmitting the available time display data to the first terminal, wherein the occupancy request information acquired from the first terminal, further comprises occupancy rate information as a percentage, wherein occupancy request information acquired from the first terminal was transmitted from the first terminal in response to input from a user interacting with an input graphical user interface displayed on the first terminal;

wherein the first processor is configured to:

receive the available time display data, analyze the received available time display data, and select a smaller subset of the plurality of displays to display on the screen; and automatically display the graphical user interface showing the availability information for each time period, the availability information including at least one of the number of displays reservable for simultaneous display and the rate thereof among the plurality of displays using the available time display data.

20. A display management method for a system, comprising a first terminal including a first memory, a first processor connected to the first memory, and a screen, and a display management device, including a second memory, and second processor connected to the second memory, the method comprising:

acquiring, by second processor, from a first terminal, occupancy request information indicating that content is requested to be displayed on a plurality of displays in a first time period and including an occupancy rate condition, the occupancy rate condition being a condition regarding at least one of the number of displays capable of simultaneous display and a rate thereof;

storing the second memory store region specifying information and reservation information, the region specifying information being for specifying a region in which the plurality of displays are positioned, the reservation information being for specifying an available date and time of the plurality of displays; and selecting, by the computer, a combination of regions and time periods in which a plurality of the number of displays reservable for simultaneous display in the first time period and a rate thereof satisfies the occupancy rate condition using the region specifying information and the reservation information stored when the occupancy request information is acquired, generating available time display data for displaying the selected regions and time periods, and transmitting the available time display data to the first terminal, wherein the occupancy request information acquired from the first terminal, further comprises occupancy rate information as a percentage, wherein occupancy request information acquired from the first terminal was transmitted from the first terminal in response to input from a user interacting with an input graphical user interface displayed on the first terminal;

wherein a graphical display device of the first terminal is configured to:
- receive the available time display data, analyze the received available time display data, and select a smaller subset of the plurality of displays to display on the screen; and
- automatically display a graphical user interface showing the availability information for each time period, the availability information including at least one of the number of displays reservable for simultaneous display and the rate thereof among the plurality of displays using the available time display data.

* * * * *